Jan. 31, 1956
A. SMITH ET AL
ADJUSTABLE HORIZONTALLY ROTATED
MULTIBLADE MOWING ATTACHMENT
Filed March 13, 1953
2,732,675
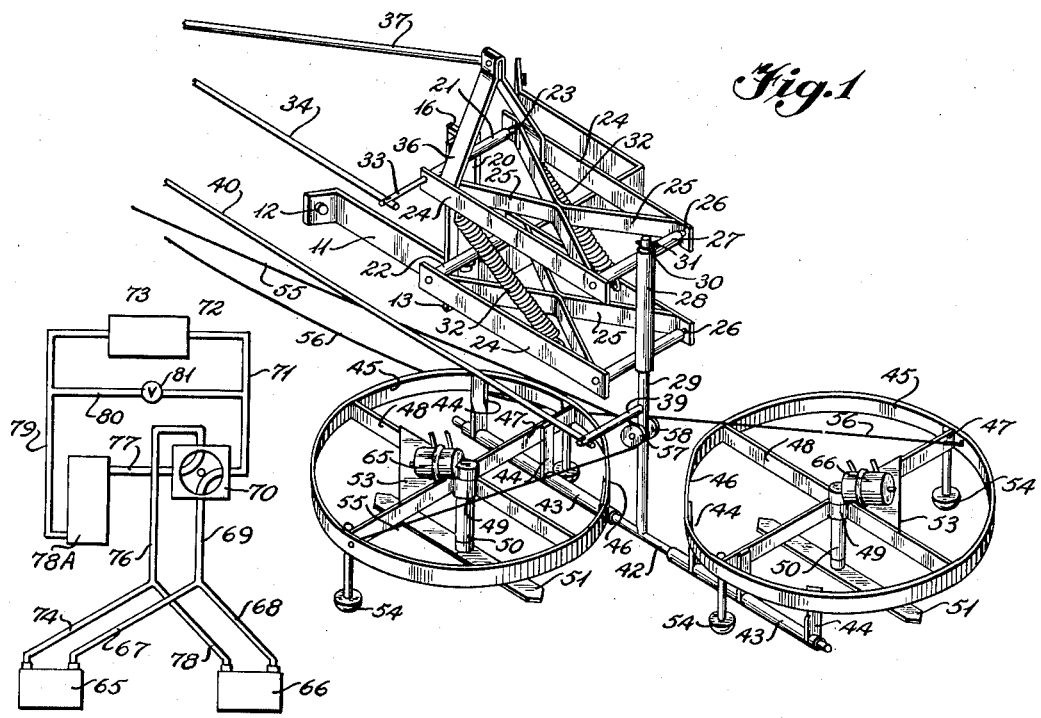
Fig.1
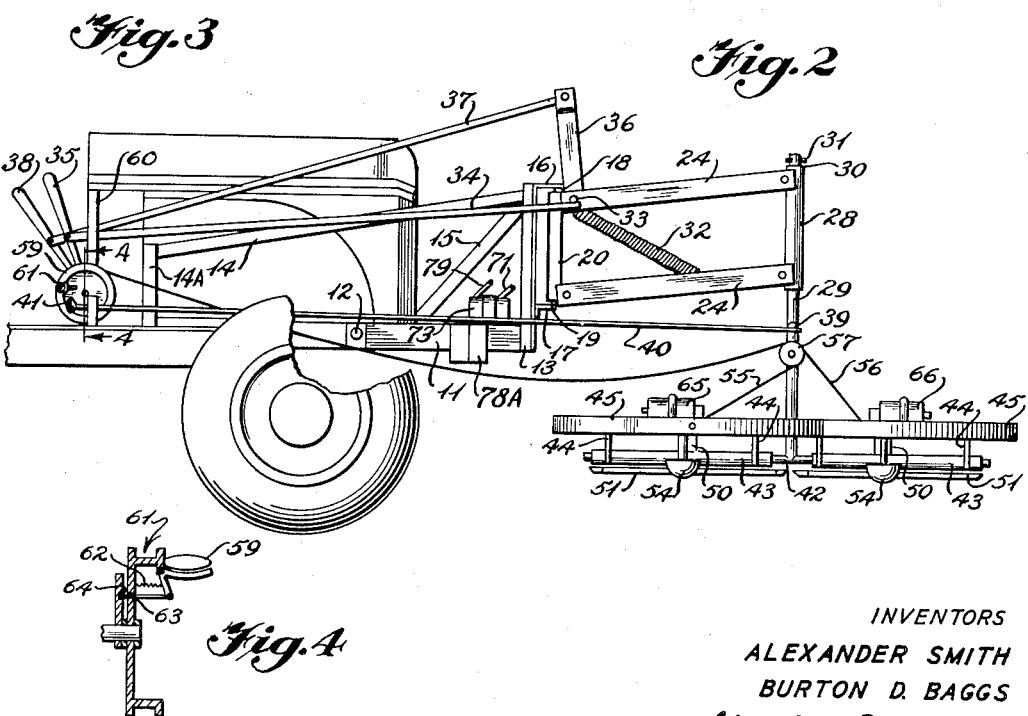
Fig.3
Fig.2
Fig.4
INVENTORS
ALEXANDER SMITH
BURTON D. BAGGS
BY A. Yates Dowell
ATTORNEY United States Patent Office 2,732,675
Patented Jan. 31, 1956

2,732,675
ADJUSTABLE HORIZONTALLY ROTATED MULTI-BLADE MOWING ATTACHMENT

Alexander Smith and Burton D. Baggs, Sanford, Fla.

Application March 13, 1953, Serial No. 342,098

9 Claims. (Cl. 56—6)

This invention relates to agricultural implements and more particularly to devices employed for the cutting of grass and other growth, which sometimes is heavy and difficult to cut.

The invention is particularly concerned with a machine for satisfactorily cutting relatively heavy tough growth requiring a very substantial amount of power for performing the cutting operation, as well as a machine which will withstand the rough treatment to which it is subjected during its use.

With relatively large mowers heretofore in use it has been possible to perform the desired cutting operation only along terrain having certain physical characteristics, for example, along a relatively flat surface and not along inclined surfaces and surfaces disposed in different planes. The difficulty has been that prior cutters have had straight or spiral blades mounted only to travel in a single or substantially horizontal plane. None of the prior structures has been able to cut grass and heavy growth along the two banks of a ditch or on opposite sides of a ridge along the highway. In attempting to cut grass on anything but a flat surface scalping or removing the turf has occurred leaving unsightly barren spots.

Relatively small mowers have been manufactured for trimming or cutting limited areas but these are not suitable for cutting relatively large areas ordinarily cut by power driven machines.

It is an object of the invention to provide a mower attachment for a tractor which can be driven from the tractor and which includes multiple independent cutters or blades, the angularity and relative position of which cutters can be independently adjusted so that the device can be employed for cutting multiple surfaces in different planes.

Another object of the invention is to provide a mower attachment of the above character in which the blades may be operated in side by side relation, in longitudinal alignment, or in any desired intermediate position thus determining the width of the cut and which blades can be independently raised and lowered to conform both to the elevation and to the inclination of the terrain on which the device is operated and with such adjustment under the control of the operator during the operation of the device.

A further object of the invention is to provide a relatively simple and durable and inexpensive mower attachment which can be easily applied to and driven from a conventional tractor and satisfactorily employed for cutting grass and other heavy growth along the opposite banks of a ditch, the opposite sides of a ridge or on other angularly disposed surface areas.

Other objects and advantages of the invention will be apparent from the following description taken in conjunction with the accompanying drawing in which:

Fig. 1 is a perspective view of the mower attachment with some of the hydraulic lines and some of the braces omitted for simplicity;

Fig. 2, a side elevation of the mower attachment mounted on a tractor;

Fig. 3, a diagram of the hydraulic control system including the pump, supply line, sump, and control valve for the mower motors; and Fig. 4 a fragmentary section of one of the control handles taken on line 4—4 of Fig. 2 for raising the mowers.

Briefly stated, the invention comprises a pair of horizontally disposed cutters mounted on vertical shafts journalled in bearings carried by a pair of substantially circular supporting frames pivoted on opposite sides of a supporting shaft at an elevation slightly above the same, and being connected to such shaft by depending brackets. Said supporting shaft is horizontally supported on said supporting frames by an upright rod or sleeve journalled in a supporting sleeve carried on the end of a mounting frame consisting of upright end sleeves between which are pivoted at a substantial distance apart a pair of rectangular connecting frames with helical springs tending to maintain the mounting frames and consequently the cutters in an elevated position but permitting vertical movement thereof. The device is pivoted to a tractor by means of suitable brackets and is driven hydraulically from the tractor system or from an independent system. The frames carrying the cutters may be rotated to bring the cutters into side by side or into longitudinal alignment or in some intermediate position and they may be raised and lowered to thereby accommodate themselves to the terrain to be cut.

With continued reference to the drawings, the invention is applied to a conventional tractor having a chassis to the front end of which a U-shaped frame 11 is secured in any desired manner as by bolts 12. At the right forward corner of the U-shaped frame 11 is welded or otherwise secured an upright bracket 13 substantially of T-shape or other suitable configuration. On this bracket is mounted the mower attachment of the present invention. A pair of braces 14 and 15 may be added to reinforce the bracket, the brace 14 running straight back substantially horizontally from the top of the bracket to an upstanding member 14A on the chassis and the other brace 15 extending diagonally across to the opposite side of the U-shaped supporting member.

From the top and bottom of the T-shaped bracket there extend a pair of arms 16 and 17 having bosses or bearing projections 18 and 19 disposed in opposed relation and forming a bearing for a sleeve 20 which is free to rotate about its vertical axis. Bearing tubes 21 and 21 are welded or otherwise fixed, one adjacent each end of the sleeve 20. These bearing tubes serve as pivotal mountings for the end rods 23 of similar rectangular frames having side bars 24 and X-type braces 25. The opposite ends of these rectangular frames have end rods 26 journalled in spaced bearing tubes 27 fixed on opposite ends of a bearing sleeve 28.

A mounting rod or sleeve 29 is journaled in the bearing sleeve 28, and is held against endwise movement in one direction by a washer or upper end engaging bearing plate 30 and a pin 31 on the upper end of the sleeve 28. In order to maintain the outer ends of the two rectangular frames elevated a pair of heavy springs 32 are attached to the upper rectangular frame near its supported end and to the lower rectangular frame near the opposite end.

In order to swing the parallel rectangular frames in a horizontal plane about their mounting pivot or sleeve 20 the upper end rod or end frame member 23 is extended to provide an arm 33 connected by a link 34 to an operating lever 35. In order to raise and lower the outer ends of the parallel rectangular frames the side bars 24 are provided with an upstanding yoke 36 from which a link 37 connects to another operating lever 38 by the operation of which vertical swing or raising and lowering of the outer end of the sleeve 28 is accomplished.

The mounting member 29 is provided with an arm 39 connected by a link 40 with an operating handle 41 located adjacent the operator.

To the lower end of the mounting member 29 is attached a transverse mounting bar 42 having arms of equal length at each side of its point of attachment to the mounting member 29. On the arms of the bar 42 are journalled bearing sleeves 43 on which are mounted by brackets 44 cutter carrying frames 45 which are made of bar stock and are circular in configuration except for a flattened portion 46 adjacent the mounting member to allow sufficient clearance to permit the cutter-carrying frames to be rotated in a plane transverse to the mounting bar 42. The cutter-carrying frames 45 are identical and include braces 47 and 48, located along the diameters of the cutter-carrying frames, the braces 47 being disposed at right angles to the bar 42, and the braces 48 being parallel to such bar.

The cutter-carrying frames extend only slightly beyond the sleeves on which they are mounted, however, they are located on opposite sides of the bar 42 and in view of the fact that they are pivotally supported they may be disposed in different positions of adjustment such as in the same general plane or in different planes with the intersecting angles either obtuse or acute.

In the center of each of the cutter-carrying frames is a sleeve 49 in which is journalled a shaft 50 having a cutter-bar 51, fixed on its lower end. Such cutter is parallel to the underside of its cutter-carrying frame so that by tilting the angularity of the cutter-carrying frame the angularity of the cutter will likewise be tilted or adjusted. The cutter-mounting bar 29 and cutter-carrying frames 45 are rotatable one-quarter of a revolution so that the cutters may be disposed in side by side relation to provide a maximum cut or in longitudinal alignment to provide a cut corresponding to that produced by a single cutter. Thus, due to the pivotal mounting of the cutters the swath of each may be along a single plane or a flat surface or on the opposite sides either of a ridge or the banks of a ditch.

The rotation of the cutters in a horizontal plane is accomplished by the operating handle 41, while the swinging of the cutters about the bar 42 can be produced by permitting the cutter-carrying frame to follow the terrain, and for this purpose a hollow semi-spherical or half-grapefruit type skid 54 may be mounted at each end of each bar 47. Thus the cutter-carrying frames and the cutters will conform to the terrain.

If desired, the angularity of the cutter-carrying frames and cutters may be manually controlled, such as, for example by the use of cables 55 and 56, attached to the cutter-carrying frames adjacent the skid 54 and extended over pulleys 57 and 58 attached to the bar 29 at an elevation slightly lower than the arm 39. The cables 55 and 56 each extends around a drum 59, pivoted to a bracket 60, and rotatable by a handle 61, such drum having a spring-pressed detent 62 extending through an opening 63 in the wall of the drum for location in one of a series of openings 64, in the bracket 60, whereby the drum is locked in a definite position, and the cutters held at a definite elevation.

The cutters are driven hydraulically and for this purpose the upper end of each shaft 50 is driven by hydraulic motors 65 and 66 through supply lines 67 and 68 connected by a common line 69 to a four-way valve 70. Lines 71 and 72 extend from the four-way valve 70 to a pump 73 for supplying hydraulic fluid under pressure to the valve 70 and thence to supply lines 67 and 68 for motors 65, 66. The pump 73 receives hydraulic fluid through line 79 from sump 78A which receives fluid from four-way valve 70 through line 77, the discharged fluid from motors 65 and 66 being conducted through lines 74 and 78 to a common line 76 to four-way valve 70, which valve provides for stopping or reversing the motors as desired, a by-pass line 80 between supply line 71 and return line 79 is provided with a pressure relief valve.

The pump 73 may be driven in any desired manner for example by means of a universal type of connection, from the front end of the crankshaft of the motor.

What is claimed is:

1. A mower attachment for tractors comprising attaching means including an elongated upright pivot, transverse pivots carried by said upright pivot one at a higher elevation than another, spaced parallel upper and lower frame members supported from said transverse pivots, an upright sleeve pivotally connected to said parallel frame members in spaced parallel relation to said upright pivot, spring means attached to said upper frame members adjacent said upright pivot and attached to said lower frame members in spaced relation to said upright pivots and permitting lowering movement of said upright sleeve against the action of said spring means, the construction allowing swinging of said upright sleeve in a substantially vertical plane, a supporting shaft journalled in said upright sleeve, a transverse bar fixed midway its length to the lower end of said supporting shaft, a cutter supporting frame pivotally mounted adjacent one lateral edge on said bar at each side of said supporting shaft, a cutter rotatably mounted beneath each cutter supporting frame and in spaced relation thereto, power means for rotating said cutters, and means for swinging said frame members and said supporting shaft horizontally and for revolving said supporting shaft to swing said cutter supporting frames and said cutters horizontally to locate them in a position between longitudinal and transverse alignment.

2. A mower attachment for tractors comprising attaching means, superimposed rectangular frames pivoted at their ends to upright spaced supported and supporting sleeves and with said supporting sleeve swingably in a substantially horizontal plane, spring means for maintaining said supporting sleeve at a substantially definite elevation relative to said supported sleeve, a supporting shaft journalled in said supporting sleeve, a transverse bar fixed midway its length to the lower end of said supporting shaft, a cutter supporting frame pivotally mounted adjacent one lateral edge on said bar at each side of said supporting shaft, a cutter rotatably mounted beneath each cutter supporting frame and in spaced relation thereto, power means for rotating said cutters, and means for swinging said frames and said supporting shaft horizontally and for revolving said supporting shaft to swing said cutter supporting frames and said cutters horizontally to locate them in a position between longitudinal and transverse alignment.

3. A mower of the horizontally rotatable blade type comprising a mobile support, at least two mounting means on said support, rotatable blade carrying means on each of said mounting means, said mounting means being universally adjustable with respect to said mobile support whereby a swath of varying width and angularity of cutting plane may be provided.

4. A mower attachment adapted to be mounted on a mobile support, said attachment comprising multiple mounting means, a pair of horizontally rotatable blade type cutters carried by said multiple mounting means, said multiple mounting means being substantially universally adjustable with respect to the mobile support on which it is mounted, whereby a swath of varying width and angularity of cutting plane may be provided.

5. A mower attachment for mobile support, said mower attachment being of the horizontally rotatable blade type and comprising a pair of mounting elements, rotatable blade carrying means, one on each of said mounting means, being adjustable substantially universally with respect to its supporting means whereby a cut may be provided of varying width and along surfaces disposed at different angles one to the other.

6. The structure of claim 3 having means whereby said cutters may operate independently at different elevations.

7. The structure of claim 3 having means for moving said cutters as a unit laterally of the path of travel.

8. The structure of claim 3 having means whereby said cutters may operate independently in different planes and means for moving said cutters as a unit laterally of the path of travel.

9. The structure of claim 3 in which said mounting means includes resilient supporting means for said cutters.

References Cited in the file of this patent

UNITED STATES PATENTS

| | | |
|---|---|---|
| 936,404 | Breaud | Oct. 12, 1909 |
| 1,054,256 | Taylor | Feb. 25, 1913 |
| 1,629,678 | Burrow | May 24, 1927 |
| 1,693,475 | Clapper | Nov. 27, 1928 |
| 1,779,020 | Swint | Oct. 21, 1930 |
| 1,894,740 | Groenig et al. | Jan. 17, 1933 |
| 2,483,683 | Wells et al. | Oct. 4, 1949 |
| 2,504,259 | Ford | Apr. 18, 1950 |
| 2,510,242 | Minns et al. | June 6, 1950 |
| 2,596,641 | Bert et al. | May 13, 1952 |